United States Patent
Budynek et al.

(10) Patent No.: US 8,725,755 B2
(45) Date of Patent: May 13, 2014

(54) METHODS AND APPARATUS OR INTERACTIVE NAME SEARCHING TECHNIQUES

(75) Inventors: Julien Budynek, Boston, MA (US); Una-May O'Reilly, Weston, MA (US); Daphna Buchsbaum, Somerville, MA (US); Pablo Funes, Somerville, MA (US); Eric Bonabeau, Winchester, MA (US); Siegfried Martens, Waltham, MA (US)

(73) Assignee: Icosystem Corporation, Cambridge, MA (US)

( * ) Notice: Subject to any disclaimer, the term of this patent is extended or adjusted under 35 U.S.C. 154(b) by 1182 days.

(21) Appl. No.: 12/119,028

(22) Filed: May 12, 2008

(65) Prior Publication Data
US 2009/0070320 A1   Mar. 12, 2009

Related U.S. Application Data

(60) Provisional application No. 60/917,239, filed on May 10, 2007.

(51) Int. Cl.
*G06F 17/30* (2006.01)

(52) U.S. Cl.
USPC .......... 707/766; 707/765; 707/E17.014; 707/E17.015; 229/100; 229/121

(58) Field of Classification Search
CPC ............ G06F 17/30985; G06F 17/30634; G06F 17/30289; G06F 17/30032; G06F 17/30056; G06F 17/30672; G06F 8/20; G06F 11/1438; G06F 11/1441; G06F 11/2094; G06F 17/2715; G06F 17/30; G06F 17/303
See application file for complete search history.

(56) References Cited

U.S. PATENT DOCUMENTS

| | | | |
|---|---|---|---|
| 6,249,784 B1* | 6/2001 | Macke et al. | 1/1 |
| 6,263,335 B1* | 7/2001 | Paik et al. | 1/1 |
| 2007/0067279 A1 | 3/2007 | Bonabeau et al. | |
| 2007/0198481 A1* | 8/2007 | Hogue et al. | 707/3 |
| 2007/0276806 A1* | 11/2007 | Tan | 707/3 |

OTHER PUBLICATIONS

International Search Report and Written Opinion for PCT/US08/63397.

* cited by examiner

*Primary Examiner* — Shyue Jiunn Hwa
(74) *Attorney, Agent, or Firm* — Morse, Barnes-Brown & Pendleton, P.C.; Sean D. Detweiler, Esq.

(57) ABSTRACT

Methods and apparatus include presenting an initial set of names to a user. The user selects a set of names from those presented. An Interactive Evolutionary Algorithm (IEA) extracts features of each selected name from a database of names and features to form a feature set. The IEA forms a set of match features that are chosen from the feature set according to a priority function and/or weighting of the features, either of which may vary in succeeding iterations. The IEA searches the database to obtain a candidate set of names, where each name has features matching the match features. One or more names is chosen from the candidate set and added into a presentation set of names. The IEA may repeat the formation of the match features, candidate set, and selection of one or more names from the candidate set until the new presentation set is complete.

14 Claims, 8 Drawing Sheets

METHODS AND APPARATUS OR INTERACTIVE NAME SEARCHING TECHNIQUES

REFERENCE TO RELATED APPLICATIONS AND CLAIM OF PRIORITY

The present application incorporates by reference the commonly-owned U.S. patent application Ser. No. 11/176,968, filed on Jul. 6, 2005, entitled "Method and Apparatus for Interactive Searching"; U.S. Provisional Patent Ser. No. 60/585,807, filed on Jul. 6, 2004, entitled "Methods and Systems for Interactive Searching"; U.S. patent application Ser. No. 11/537,143, filed on Sep. 29, 2006, entitled "Methods and Apparatus for Interactive Searching Techniques"; and U.S. Provisional Patent Ser. No. 60/721,637, filed on Sep. 29, 2005, entitled "Methods and Apparatus for Interactive Searching Techniques".

The present application claims priority to the following provisional patent application, the entirety of which is expressly incorporated herein by reference: U.S. Ser. No. 60/917,239 filed on May 10, 2007.

FIELD OF THE DISCLOSURE

The disclosed methods and systems relate generally to searching for information from a database, and in particular for facilitating the choice of a name, e.g., for a child, a pet, or a product/company.

BACKGROUND

Search engines assist a user in identifying information that may be stored on a computer server or other information storage media. Generally, the information may be in the form of a database (e.g., any structured database, any database of objects with tags or descriptors). The information may include, for example, various web page content, photographs, goods or services for sale, or any other item that can be represented and stored in electronic format. Some examples of commonly used search engines include, but are not limited to Yahoo®, MSN®, Google™, Amazon.com®, a9.com, AOL®, Lycos®, LookSmart®, Altavista™, Ask Jeeves®, Orbitz™, Travelocity®, Expedia.com®, and Flickr.com™.

Search engines typically require the user to enter one or a plurality of keywords, and in some cases, to specify one or a plurality of Boolean operators to determine the logical relationship between the pluralities of keywords. This provision of one or more keywords and/or optional Boolean operators is referred to as the "search query." A search engine executes one or more algorithms which act on the search query to identify one or a plurality of items of information that satisfy the search query (this information is commonly referred to as "search results"). The search engine generally returns the results of the search algorithm by presenting them to the user through some form of a user interface (e.g. display). In some instances, when a plurality of search results is available, the search engine may further determine which specific results to present to the user according to some criteria (e.g. ranking, optimization). The user is then able to select one or a plurality of search results. If none of the results is satisfactory, or if additional results are sought, the user can select to view additional results, or the user can refine or modify the search query, for example, by adding or removing one or more keywords and/or optional Boolean operators.

In addition to conventional search engines, which may execute various proprietary algorithms to process search queries and provide results according to some type of ranking of optimization process, a search query may be executed by a web directory service. Unlike a search engine, a web directory service that is capable of processing a search query returns to the user lists and categories of web sites, as search results, without necessarily ranking, promoting or optimizing the list of web sites. One example of a web directory service is the Open Directory Project, hosted and administered by Netscape Communication Corporation (see http://dmoz.org).

Interactive search is a way of presenting information to a user and letting the user provide feedback to improve the quality of the search until a desirable item is found. Interactive search differs fundamentally from other search methods; for example, it may be geared toward searches in which the user does not exactly know what he is looking for, or when a normal search may return a vast number of items. In both of these circumstances, Bonabeau and Gaudiano in commonly-owned U.S. patent application Ser. No. 11/176,968, filed on Jul. 6, 2005, entitled "Method and Apparatus for Interactive Searching" and U.S. Provisional Patent Ser. No. 60/585,807, filed on Jul. 6, 2004, entitled "Methods and Systems for Interactive Searching" have recognized and appreciated that identifying the specific item(s) of interest to the user may be facilitated by an evaluation of the user's subjective preferences.

One exemplary embodiment of the methods and apparatus disclosed therein is described in overview in FIG. 1. In this embodiment, a user 105 wishes to purchase a gift 110, but does not have a specific gift in mind. The user may employ a computer 115, including a display 115-1, a selection device 115-2 (e.g., a keyboard or a mouse), and one or more processors 115-3, to initiate a search query via a search component (e.g., a search engine or web directory service), which then presents to the user information regarding gift items, pursuant to the search query. In one aspect, since it is assumed the user does not have specific gift criteria in mind, the initial search query may indeed by quite crude or vague (e.g., the query might be based on the gender and/or age of the person for whom the gift it intended). Alternatively, the information regarding potential gift items may be generated randomly, for example, from a merchant's database, and/or the information may be selected. The user 105 then employs an interactive search process 120, as discussed in greater detail below, to actively evaluate her search options in accordance with her subjective preferences. She continues using the interactive search process 120 until she finds a desired gift item.

It should be appreciated that although the exemplary process depicted in FIG. 1 illustrates the selection of a gift, virtually any type of item identified in some manner in a searchable database may be searched for by the user in a similar interactive manner, according to various embodiments of the disclosure therein.

FIG. 2 illustrates in somewhat greater detail the interactive search process 120 indicated in FIG. 1, according to one embodiment of the disclosure therein. As discussed further below, the process outlined in FIG. 2 includes some optional steps or acts that are not necessarily required in all embodiments of the said disclosure. Thus, the description below should be understood as including various concepts that may be optionally included in different implementations of methods and apparatus according to the disclosure therein.

In the embodiment illustrated in FIG. 2, the interactive search process 120 begins in block 205 by displaying search results to the user 105 shown in FIG. 1. In one aspect of this embodiment, the search results may be randomly generated. In other aspects, a search component may execute a previous search query to generate the search results. Examples of such search components include, but are not limited to, Yahoo!®, MSN®, Google™, Amazon.com®, a9.com, AOL®, Lycos®, LookSmart®, Altavista™, Ask Jeeves®, Orbitz™, Travelocity® Expedia.com®, Flickr™, and the Open Directory Project.

In another embodiment not specifically depicted in FIG. 2, an interactive search process may more generally provide information relating to initial search results by representing all or a portion of the information as any one of a number of perceivable indications to the user 105. For example, all or a portion of the information relating to the search results may be provided as one or more audible or visible indications. With respect to visual indications, as indicated in block 205 of FIG. 2, all or a portion of the information may be displayed textually and/or graphically, including graphic displays of a plurality of images or diagrams representing respective items of information (e.g., individual items in the search results). In one exemplary implementation discussed further below, respective items in the search results may be graphically displayed to the user as a two dimensional grid of images or diagrams representing the items.

In block 210 of FIG. 2, the user decides whether the initial search results provided in block 205 contain desired information (e.g., a desired item in the search results). If so, the user can opt to end the process. Otherwise, the user may continue the process in block 215.

In block 215 of FIG. 2, the user is permitted to evaluate the search results to provide feedback. In one exemplary implementation, the user may evaluate the search results, for example, by utilizing a mouse, keyboard or other selection device in combination with evaluation options presented to the user via a computer display. In one aspect, the user feedback may include assigning a degree of randomness, based on evaluating a plurality of items in the search results, for generating a new search query according to subsequent acts in the process detailed below. In another aspect, the user feedback may include assigning a subjective value (also referred to as a "fitness" measure, or weight, or grade, or rank) to one or more items in the search results. In one exemplary implementation, one or more subjective values assigned by the user may be represented in some fashion on the display, in coordination with a representation of an item to which the subjective value is assigned. For example, in one embodiment, items of the search results may be graphically displayed as a two dimensional grid of images or diagrams, and subjective values assigned to different item may be respectively represented in some fashion on the grid of images or diagrams.

In other aspects, the user may select a subjective value from at least two or more possible subjective values to indicate the relative desirability of a given item in the search results. For example, by merely selecting (highlighting) a given item, the user may indicate that item's desirability. Non-selected (non-highlighted) items may then be considered as undesirable. In another aspect, the user may assign a positive value to desirable items, a negative value to undesirable items, and one or more items not particularly addressed by the user may be assigned a neutral value. In yet another aspect, the user may assign a subjective value for a given item from within a range of possible values between some minimum value and some maximum value (e.g., a degree of fitness, weight, grade or rank). In yet another aspect, a subjective value for one or more items may be assigned based on a user's response time to comment on a given item. The forgoing examples are provided primarily for purposes of illustration, and are not intended as limiting. Additionally, as discussed above, various options for assigning a subjective value to one or more items in the search results may be facilitated via the use of a computer display and/or selection device (e.g., keyboard, mouse).

In block 220 of the interactive search process illustrated in FIG. 2, the user may be given the option to modify (e.g., add, delete, alter) one or more characteristics associated with the search results. In one embodiment, each item in the search results may be associated with one or more characteristics. In one aspect, one or more characteristics associated with each item may include any descriptor for the item made available via a given search component's application program interface (API). Examples of such characteristics associated with a given item in the search results may include, but are not limited to, one or more tags (which may include one or more keywords, comments, URL links, and/or XML information), one or more classification-oriented identifiers, one or more categorization-oriented identifiers, and one or more semantic web-based identifiers. More specifically, one or more characteristics associated with a given item may include one or more taxonomy-related identifiers for the item, one or more ontology-related identifiers, and/or one or more folksonomy-related identifiers (e.g., "people who bought book X also bought book Y") (the terms "taxonomy," "ontology," and "folksonomy" are intended to have the respective meanings that would be readily associated with them by one of ordinary skill in the relevant arts).

In block 225 of FIG. 2, the process may optionally compare the present feedback provided by the user to previous feedback provided by the user, assuming that the interactive search process 120 shown in FIG. 2 has completed at least one loop of iteration. By optionally memorizing previous feedback, the process 120 may employ adaptive learning techniques (e.g., trend analysis) to ultimately shape the generation of a new search query. In one aspect of an implementation employing such adaptive learning techniques, one or more subjective values assigned by the user to one or more corresponding items in the search results may be modified prior to further processing (e.g., averaging subjective values from feedback gathered over multiple iterations, weighted averaging of subjective values, etc.).

In block 230 of the process 120 shown in FIG. 2, one or more evolutionary algorithms are performed based on the immediate user feedback (e.g., one or more subjective values assigned in block 215), or cumulative feedback provided by block 225. Again, the subjective value(s) constituting the user feedback may be viewed in terms of assigning a "fitness" measure or desirability in connection with one or more items in the initial search results.

In one embodiment, to facilitate the execution of one or more evolutionary algorithms in block 230, one or more characteristics associated with each item, or one or more characteristics that have been modified by a user (as discussed above in connection with block 220), are encoded as one or more "genes" in a genetic string associated with each item. Hence, each item in the search results may be associated with a corresponding genetic string that includes one or more genes, wherein each gene represents a characteristic of the item (e.g., a tag, keyword, comment, identifier, descriptor, attribute, etc., as discussed above).

In block 230, once one or more such genetic strings are assembled, the evolutionary algorithm including one or more genetic operators is then applied to the one or more genetic strings associated with one or more items. Genetic strings are considered in the evolutionary algorithm based on their corresponding "fitness," i.e., the user feedback (subjective value) assigned to the one or more items with which the strings are associated, to generate a new search query in block 235.

In various aspects, the genetic operators applied by an evolutionary algorithm in block 230 may include, but are not limited to, a selection operator, a mutation operator, a recombination operator, a crossover operator, a directed operator, a constraint operator, and a preservation (elitism) operator. For purposes of the Bonabeau and Gaudiano disclosure, and as would be readily understood by one of ordinary skill in the relevant arts, an evolutionary algorithm (also referred to as a genetic algorithm or program) generally is concerned with three possible factors, namely: 1) a population of one or more "parents" that may be randomly initialized (e.g., in the process 120, a "parent" may be considered as a genetic string associated with a given item in the search results); 2) one or more mutation operators capable of altering at least one "parent" to a "neighboring solution" (this process also may be referred to as a "local search operator"); and 3) a recombination operator which can recombine genetic strings of two parents into a "child" that inherits traits from both parents (this process also may be referred to as a "global search operator").

In connection with evolutionary algorithms as applied in Bonabeau and Gaudiano, an exemplary mutation operation may be generally understood to potentially introduce randomness to the process, as a mutation operator may be configured to delete one or more genes of a given genetic string, or add one or more random genes to a given genetic string. Exemplary recombination operations can include reproduction, mutation, preservation (e.g., elitism) and/or crossover, where crossover can be understood to be the combination of two individuals (the "parents") to produce one or more offspring (the "children") (i.e., a crossover operator may be configured to combine genes of at least two given genetic strings to produce one or more offspring). Those of ordinary skill will recognize that a crossover operator may include asexual crossover and/or single-child crossover. Accordingly, crossover can be more generally understood to provide genetic material from a previous generation to a subsequent generation. In one exemplary evolutionary algorithm that may be employed in an implementation of the process 120 shown in FIG. 2, at least one crossover operator is applied to at least two genetic strings respectively associated with two items in the search results to generate an offspring, and at least one mutation operator is subsequently applied to the offspring to generate a new search query.

Variations of evolutionary algorithms, and different genetic operators used in various combinations, several of which are suitable for the process 120 shown in FIG. 2, are well known in the art. Accordingly, the examples presented herein are discussed primarily for purposes of illustration, and are not intended as limiting. In some exemplary implementations, one or more evolutionary algorithms are designed a priori to act on one or more genetic strings, and may not be altered by the user. In other implementations, the user may be provided with the capability to design their own evolutionary algorithm by selecting one or more genetic operators to apply to one or more genetic strings input to the algorithm, as well as an execution sequence for multiple genetic operators. The user's interaction with the process 120 then may include evaluation of fitness for a particular item, modification of one or more of an item's characteristics (genes) and evolutionary algorithm design.

As discussed above, in block 235 of FIG. 2, a new search query is generated by one or more evolutionary algorithms. As indicated in block 240, in one exemplary implementation the user optionally may be allowed to modify the new search query to introduce a new theme (e.g., one or more new search terms) not present in the generated search query. In one aspect of this implementation, the new search query generated by the one or more evolutionary algorithms would be displayed to the user (e.g., via a computer display) for modification.

In block 245 of the process 120 outlined in FIG. 2, the new search query generated in block 235, or a user-modified new search query optionally provided in block 240, is executed by a search component (e.g., search engine or web directory service), and new search results are generated in block 250. In one exemplary implementation, the same search component that was employed to initially generate search results in block 205 is again employed to execute a search query in block 245. In one aspect, the new search query or user-modified new search query may be passed to the search component via the search component's application programming interface (API).

Once new search results are generated in block 250, block 255 indicates that the user optionally may define a filter that is applied to the newly generated results. For example, in one exemplary implementation, the user may define one or more constraints (e.g., provide only those results that cost less than $100, provide only green items, provide only 10 items) to selectively filter out possibly undesirable results from the newly generated results.

As indicated in FIG. 2, the unfiltered results generated in block 250, or the optionally filtered results generated in block 255, are then displayed in block 205 as the process 120 returns to the beginning for another iteration. For example, the user may subsequently evaluate the newly generated unfiltered or filtered search results in block 215 to provide new feedback, and optionally modify one or more characteristics (genes) associated with a given item in the new search results, as indicated in block 220. Furthermore, now that at least one iteration of the process has been completed, the adaptive learning or trend analysis feature indicated in block 225 may be utilized based on comparing present user feedback to previous user feedback, and one or more evolutionary algorithms again may be performed in block 230, based on present (immediate) or cumulative feedback, and modified or unmodified genes associated with the new search results.

With reference again to FIG. 1, the interactive search process 120 discussed above in connection with FIG. 2 may, in one embodiment, be implemented with the aid of a conventional computer 115 (e.g., a personal computer, laptop, etc.) that includes a display 115-1 configured to convey information (e.g., search results) to the user 105, one or more selection devices 115-2 (e.g., a keyboard and/or mouse) configured to permit the user to interact with the process (e.g., evaluate the search results, modify genes, define filters or constraints), and one or more processors 115-3 configured to implement various steps or acts of the interactive search process 120.

In one exemplary implementation, the computer 115 includes a computer-readable medium 115-4 (e.g., various types of memory, compact disk, floppy disk, etc.) having computer-readable signals stored thereon that define instructions which, as a result of being executed by the one or more processors of the computer, instruct the computer to perform various steps or acts of the interactive search process 120. In another implementation, the interactive search process 120 is configured to "sit on top of" a conventional search component invoked by the user of the computer, by obtaining one or more characteristics or "genes" associated with a given item of information via the search component's API, and providing new search queries to the search component via its API.

According to various embodiments, the user may interact with the search process 120 via a number of possible techniques involving the display 115-1 and one or more selection devices 115-2. For example, as discussed above, information representing search results may be displayed on the display 115-1 in a variety of textual and/or graphical (e.g., iconic) formats. The user may utilize one or both of the display 115-1 and one or more of the selection devices 115-2 to click on/select/highlight various items of displayed information to provide some type of user feedback (e.g., assignment of subjective value to an item).

In one exemplary embodiment in which respective items of information are represented as images or diagrams surrounded by a border, a user may click on an item to change its evaluation between neutral (e.g., no border), positive (e.g., grey or some other color border) or negative (e.g., crossed out). In another embodiment, the user may obtain additional information about a particular item (e.g., characteristics or genes associated with the item) by letting a cursor hover over the image or diagram corresponding to the item or right clicking over the image or diagram corresponding to the item, for example. In yet another embodiment, an image or diagram corresponding to one or more items may be associated with a small slider, entry box, or pull-down/drop-down box, etc., displayed near or over the image or diagram. In the example of a slider, the user may adjust the slider with one of the selection devices to assign a subjective value to the item within a range of values from some minimum value to some maximum value represented on the slider. In the example of an entry box or pull-down/drop-down box, the user may manually enter a value from the keyboard, or select a value from amongst multiple possibilities conveyed by a menu. In yet another embodiment, the user may select a degree of randomness in generating new search queries through a slider representing two extremes labeled "Guide Me" and "Surprise Me," corresponding respectively to low and high degrees of randomness. It should be appreciated that the foregoing examples are provided primarily for purposes of illustration, and that various embodiments of the present disclosure are not necessarily limited in these respects.

FIGS. 3*a*, 3*b* and 3*c* provide another illustrative embodiment of some of the concepts discussed above. FIG. 3*a* shows a set of items as a 4×3 grid, though other configurations are possible. The initial set of items may be generated by an initial search query. In FIG. 3*b*, the user may obtain additional information on any given item represented in the grid, such as price and availability, by letting the cursor hover over the item, and/or by right-clicking the item. In FIG. 3*c*, the user 105 can select, or click on, a particular item in order to change its evaluation between neutral (no border), positive (grey border) or negative (crossed out). FIG. 3*d* illustrates the results of a subsequent search query pursuant to the interactive search process 120, which may include the items selected by the user or similar items, but not include items indicated with a negative feedback by the user or similar items. The new search results also may include other random items the user has not seen, and/or other items similar to those the user has already seen but not evaluated. For example, in FIG. 3*c*, the user had given positive feedback to a watch and a camcorder, and negative feedback to an electronic keyboard and a set of dishes. The next selection in FIG. 3*d* includes additional watches and cameras, and additional items. In FIG. 3*c*, the user has given positive feedback to all the watches, and negative feedback to the clothes and the wreath, while leaving the camera equipment as neutral. By continuing in this fashion, the user will eventually converge on a specific item or set of items that is satisfactory.

Yet another exemplary embodiment implementing various concepts according to the Bonabeau and Gaudiano disclosure includes a web-based system that enables the user to select a venue for a vacation. When looking for a vacation, most Internet-bases search engines such as Orbitz™, Travelocity®, and Expedia.com® can offer information about specific hotels, resorts, etc., but require the user to have a clear idea of (e.g., to specify) a destination. In many cases, a person looking for a vacation destination may only have an approximate idea of a destination/time, e.g., "I want to spend one week in January someplace warm with my husband and two children." With existing travel sites, the user has to select a geographical area, and look through a list of possible venues (e.g., selected on the basis of price range) to identify one with the desired characteristics. However, the user may initially have no idea of which particular geographical locations are satisfactory, and even if s/he has an idea of the geographical area (e.g., the Caribbean), s/he may not know which specific locations and which venues at that location satisfy her/his constraints.

Some online vacation sites allow a user to specify a number of criteria in a sequential fashion, for instance by starting with a specific location, then selecting price range, activity types, etc.; however, in this way, the search is narrowed unnecessarily and may cause a user to overlook some potentially suitable alternatives. For example, if a user begins by selecting the Caribbean, s/he may eventually identify a resort in Cancun, but there may have been other venues (e.g., Canary Islands) which have similar and perhaps more desirable characteristics, where such other venues which were not presented to the user after the initial decision.

In view of the foregoing, in one embodiment, the user is presented with a grid of images, each image being a picture representing one venue. Below each image may be a row of icons representing key characteristics of the property, such as cost, style (single, couple, family, . . . ), geographical location, etc. A second row below the image can include simple iconographic buttons that allow the user to obtain additional information in a pop-up window (e.g., view additional photos, read client reviews, determine availability), to provide evaluative feedback about the property (this can be as simple as a thumbs-up/thumbs-down pair, or a slider), to save this property to a folder representing the user's current selection portfolio, and/or to actually make a reservation at this property.

In one aspect of this embodiment, the display below the entire grid of images may include one or more buttons and sliders, including a button to generate a refined set of properties based on the user's feedback, a button to start with a fresh random set of properties, a slider labeled with the extreme values "Surprise me" and "Guide me" which determine the level of randomness of the search as described for the previous embodiment, a button that brings the user to her current portfolio of selections, and navigation buttons to trace backwards and forward through the selections made during a given search session.

In other aspects of this embodiment, an additional set of buttons, pull-down menus, radio buttons, and/or text entry boxes can be included. Through these various devices, the user can specify a filter, i.e., one or more constraints, that apply to all searched properties. For instance, if the user wants only family-oriented resorts by the sea, s/he can specify these criteria to ensure that inappropriate properties are not selected during search.

SUMMARY

Search engines and web directory services (also referred to herein as "search components") generally are designed to identify as closely as possible a specific piece (or specific pieces) of information that the user is seeking. To provide satisfactory results, the search component typically relies on the ability of the user to provide a "good" search query. Applicants have recognized and appreciated, however, that there may be a situation in which the user is not able to create a good search query. Examples of such a situation include, but are not limited to, (a) when the user does not know exactly what he or she is searching for; and (2) when there are a very large number of results that satisfy the user's initial search query to the search component. In these and perhaps other instances, the user can become frustrated with the inability of the search component to provide a meaningful set of results; in effect, a traditional search query including one or more keywords and/or Boolean operators does not render satisfactory results.

Applicants have also recognized and appreciated that for at least some search applications (including the examples provided above in which the user does not know exactly what he or she is looking for, or when there is a large number of results), affording the user with the ability to subjectively evaluate search results, or otherwise interact with the search component, may facilitate the generation of significantly more satisfactory search results in an iterative fashion. Such search applications may include expectant parents' searches for names for their unborn child, or the search for a name, e.g., for a pet, or for a product or company. Moreover, the methods and apparatus may apply to data in any language (such as American English, Spanish, or Chinese), therefore offering possibilities to a wide international audience.

The methods and apparatus disclosed herein may present a set of name suggestions that have been retrieved from a database by using a set of names selected by the user, according to preference, from a presentation set of names and/or entered by the user from the said database. The user may find desirable names without any stipulation of name properties such as first letter, number of syllables, origin, meaning, or access to name lists categorized by style or popularity. The methods and apparatus may derive the name suggestions from the names selected or entered by the user and from feature information relating to the selected and entered names, which feature information may be unseen by the user in the database. The methods and apparatus may also derive suggestions from information relating to usage by some or all previous users of the service. In particular, adaptive learning can be carried out using data from many or all past users of the service, in order to derive collective trends or collective usage clusters (e.g. "users who liked this also liked that").

In view of the foregoing, various embodiments of the present disclosure are directed to methods and apparatus for interactive name searching.

In a general aspect, the application is directed to methods and apparatus that may include presenting an initial set of names, the "presentation set", to the user. The presentation set may correspond to the "information" presented to the user in various embodiments described herein. The user may select some names from the presentation set that he/she likes and/or provide other names that can be found in the database. The names selected and/or provided by the user form a "selection set". The user may also negatively marked or block names in the presentation set, and the names negatively marked or blocked by the user may be excluded from future suggestion sets or presentation sets. The selection set may correspond to the "feedback" described in relation to various embodiments herein. Each name has an associated set of features and each feature may be weighted. For example, the features may include popularity, origin, meaning, phonetics, syllabics, phonemics, style and alphabetic structure, wherein one feature, popularity for example, may have a greater weight than another, for example phonetics. The set of features may correspond to the "genetic string" described in relation to various embodiments herein, wherein the features may correspond to the "genes".

The methods and apparatus extract the features of names in the selection set from the database of names and features to form a "feature set". The methods and apparatus utilize an Interactive Evolutionary Algorithm (IEA) to form a "set of match features" based upon the feature set. The set of match features may be derived according to a priority function and/or a weighting of the features. Forming sets of match features may correspond with the forming of "search queries" described in relation to various embodiments herein. The IEA searches the database to obtain a candidate set of names, where each name has features relating to the match features. One or more names may be chosen from the candidate set and added into a presentation set of names. The IEA may repeat the formation of the match features, candidate set, and selection of one or more names from the candidate set until the new presentation set is complete. With each iteration, the priority function and/or weighting of the features may be varied so as to provide a new set of match features and a new candidate set. Once completed, the new presentation set is then presented to the user as per the initial presentation set and the sequence may repeat, or the user may be satisfied and not proceed further.

Another aspect is a computer-readable medium having computer-readable signals stored thereon. The computer-readable signals define instructions which, as a result of being executed by a computer or computer system, instruct the computer or computer system to perform a method of interactive name searching, as previously described. That is to say, the computer-readable medium has the said instructions stored therein.

Yet another aspect is a computer or computer system having a user interface. The user interface includes a display or other output device and a selection device or other input device. The computer or computer system includes a computer-readable medium with instructions stored therein which, as a result of being executed by the computer or computer system, instruct the computer or computer system to perform a search method that executes the IEA in the manner as previously described.

Any of the above aspects may include one or more of the following features. In some implementations, the methods further include independently storing the presentation sets in a memory storage device; and independently retrieving the presentation sets from the memory storage device. The user may actuate a retrieving button, wherein the actuating of the retrieving button once may retrieve a previous presentation set once removed and the actuating of the retrieving button twice may retrieve a previous presentation set twice removed. The memory storage device may be selected from a group comprising: a semiconductor memory device, a flash memory device, a magnetic disk, an internal hard disk, a removable disk, a magneto-optical disk, a CD-ROM disk and a DVD-ROM disk. Other memory devices also are contemplated.

In other implementations, the evolutionary algorithm may include at least one of the following genetic operators: a selection operator, a mutation operator, a recombination operator, a crossover operator, a directed operator, a constraint operator, or a preservation operator. Such operators may be used in conjunction with, in lieu of, and/or may form a part of the priority function and/or weighting for forming the iterative sets of match features.

Still other implementations are directed to the user selecting a priority function and/or weighting from a range of possible functions and/or weights. The methods may further include allowing the user to delete a name from the presentation set, wherein the priority function and/or weighting for one or more of the features of the set of features for the deleted name may be negatively affected.

Still other implementations are directed to the user explicitly negatively marking names, or blocking names, that are to be excluded from any future suggestion set or presentation set.

Still other implementations are directed to limiting the names included in presentation sets according to preferences expressly provided by the user, or inferred from user selections, such as showing only names of Latin origin, or showing only names that have been popular recently.

Still other embodiments are directed to incorporating users' preferences into the database of features based on usage of the methods and apparatus.

Still other embodiments are directed to incorporating information derived from past usage of the service by some or all users.

In other implementations, the evolutionary algorithm may include a mutation operator configured to delete a gene of a given genetic string and/or to add a random gene to the given genetic string. The method also may include applying the mutation operator to the genetic string associated with a name or a set of names to generate a further search query.

Other implementations are directed to the evolutionary algorithm including a crossover operator configured to combine genes of two given genetic strings to produce an offspring, and/or a mutation operator configured to delete a gene of a given genetic string and/or add a random gene to the given genetic string. The evolutionary algorithm also may comprise application of the crossover operator to the genetic strings respectively associated with two names to generate the offspring, and the application of the mutation operator to the offspring to generate the further search query.

In other implementations, the user may evaluate the new presentation set to provide a second selection set based at least in part upon the new presentation set. The evolutionary algorithm may be used to evaluate the second selection set in order to generate a further search query. The further search query may be generated, at least in part, based upon the first selection set and/or the second selection set. The evolutionary algorithm also may be used to evaluate further selection sets in order to generate still further search queries. The further search queries may be executed to provide further presentation sets. The act of generating a further search query may include generating the further search query based on a trend or trends derived from two or more selection sets.

In yet other implementations, the further presentation set may include a further plurality of names. Each name of the further plurality of names may be associated with one or more further characteristics. The encoding of the further characteristics associated with each name may be as a further gene of a further genetic string associated with each name.

In other embodiments, the user may select a first desired name from a first plurality of names in a presentation set and a second desired name from a second plurality of names in the same or another presentation set. The first and second desired names may be combined and generate a further query. The combination of the first and second desired names may include selecting the second desired name from a second display, dropping the second desired name into a first display, and generating a third display, wherein the third display displays a third presentation set. The evolutionary algorithm may be applied to the genetic string associated with the first desired name and the second genetic string associated with the second desired name.

The present disclosure also incorporates herein by reference the entirety of U.S. Pat. No. 7,043,463, filed Apr. 1, 2004, entitled "Methods and Systems for Interactive Search."

It should be appreciated that all combinations of the foregoing concepts and additional concepts discussed in greater detail below are contemplated as being part of the inventive subject matter disclosed herein.

DETAILED DESCRIPTION

To provide an overall understanding, certain illustrative embodiments will now be described; however, it will be understood by one of ordinary skill in the art that the apparatus and methods described herein can be adapted and modified to provide apparatus and methods for other suitable applications and that other additions and modifications can be made without departing from the scope of the systems and methods described herein.

Unless otherwise specified, the illustrated embodiments can be understood as providing exemplary features of varying detail of certain embodiments. Therefore, unless otherwise specified, features, components, modules, and/or aspects of the illustrations can be otherwise combined, separated, interchanged, and/or rearranged without departing from the disclosed systems or methods.

Figure 1:
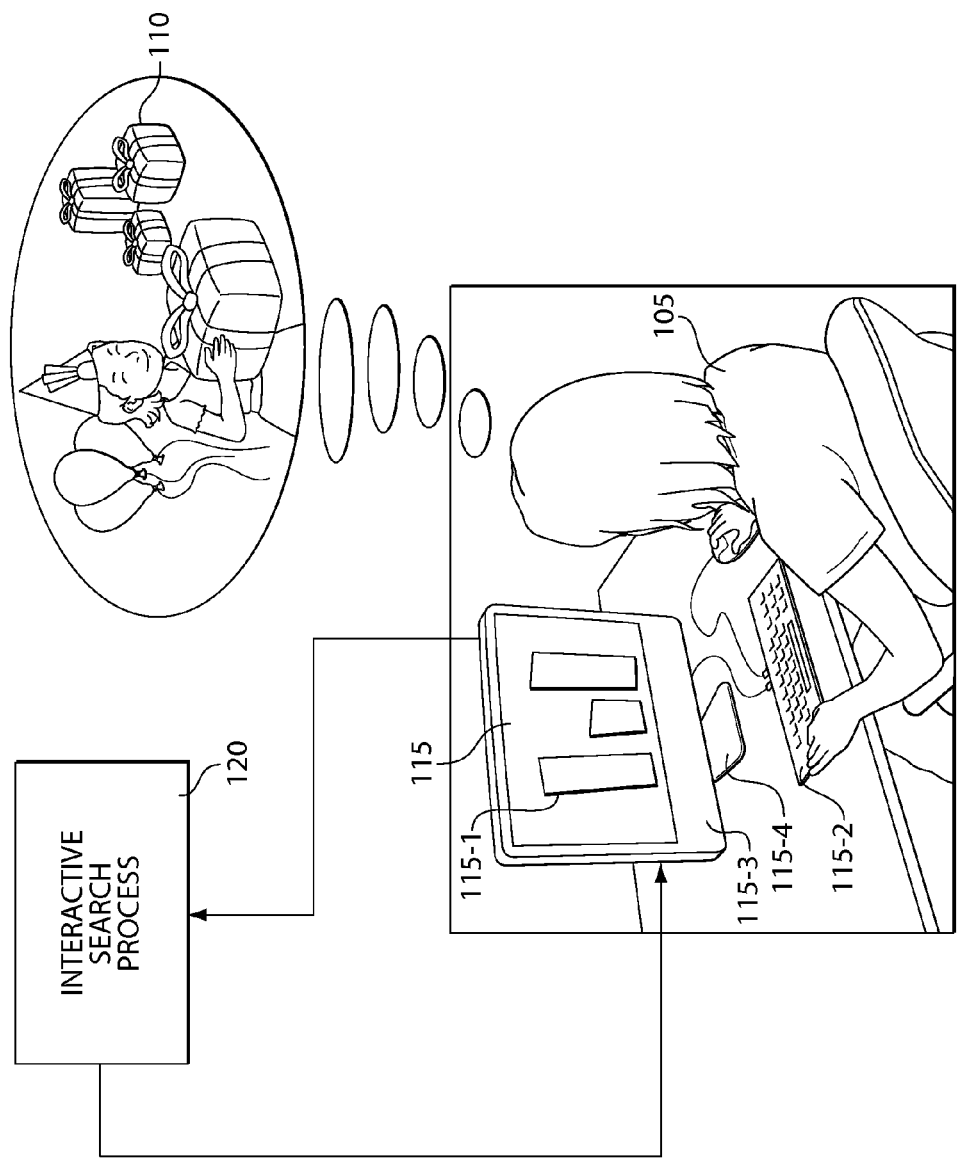
FIG. 1 is an overview of a user performing an interactive search process, according to one embodiment of the disclosure of Bonabeau and Gaudiano.
Figure 2:
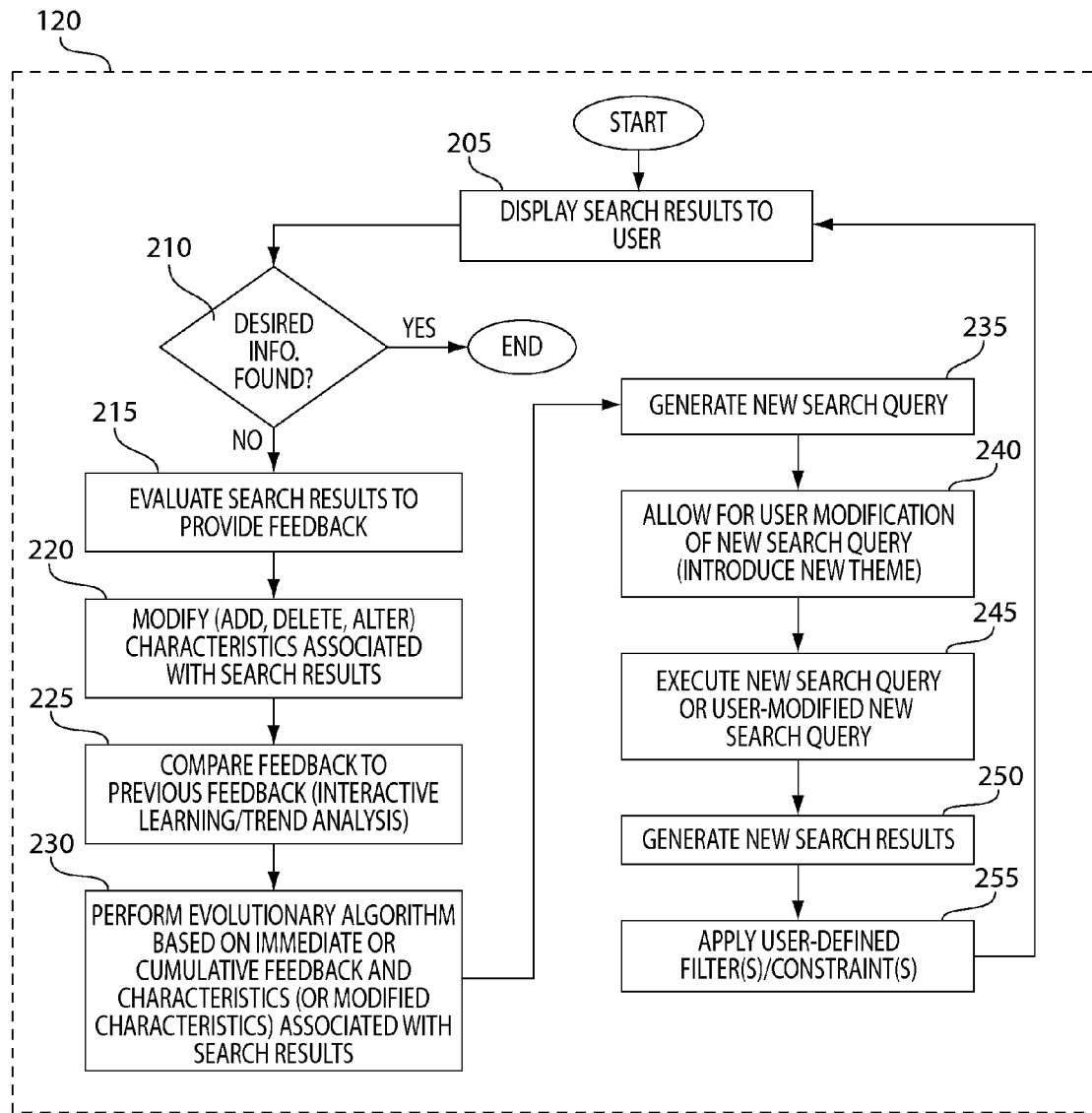
FIG. 2 is a flow diagram of the interactive search process indicated in FIG. 1, according to one embodiment of the disclosure of Bonabeau and Gaudiano.
Figures 3A, 3B:
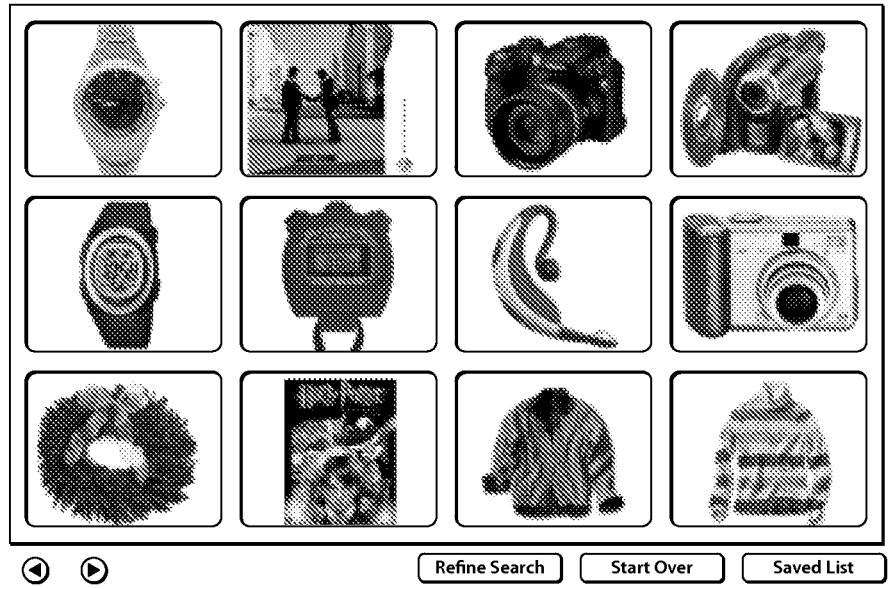
FIGS. 3a, 3b, 3c and 3d provide illustrations of some of the concepts discussed in connection with FIGS. 1, and 2, according to one embodiment of the disclosure of Bonabeau and Gaudiano.
Figure 3C:
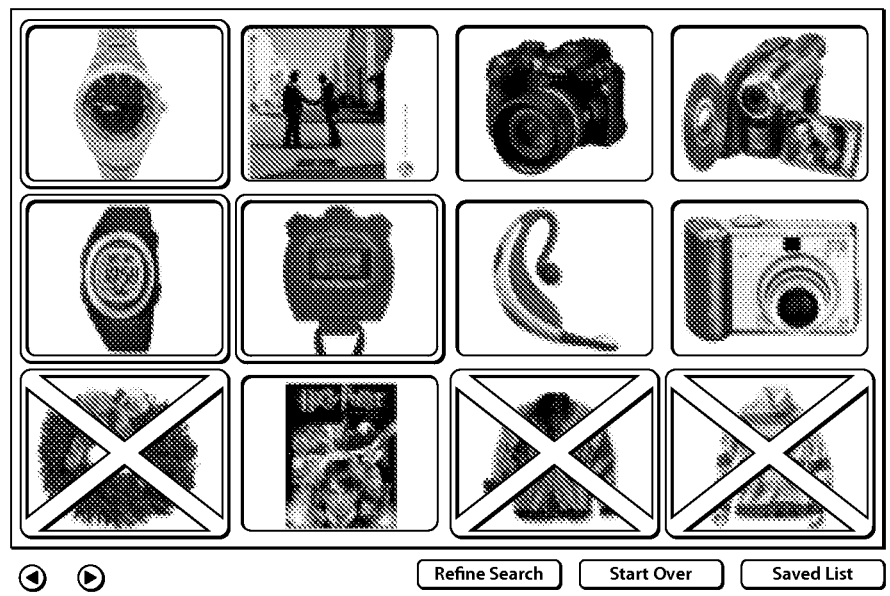
Figure 3D:
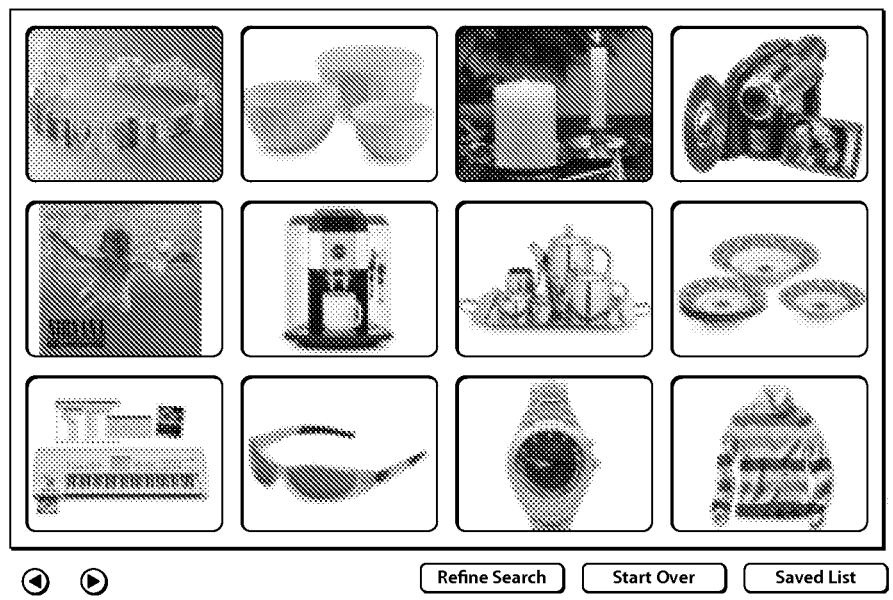
Figure 4:
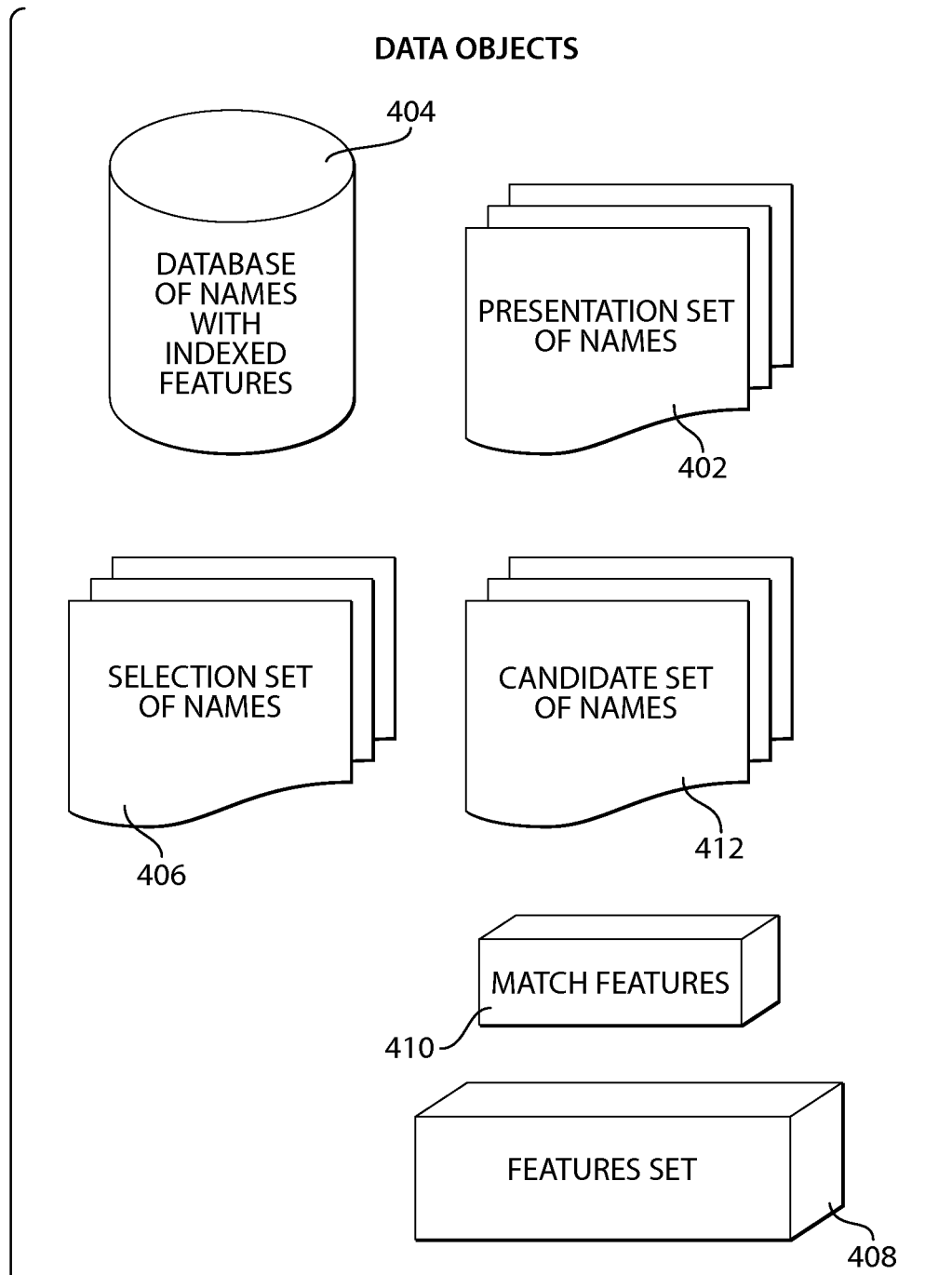
FIG. 4 provides an illustration of data objects according to an embodiment of the present disclosure for interactive name searching.

FIGS. 4 and 5a-5c illustrate an exemplary embodiment of the present disclosure for interactive name searching. Users may obtain sets of desirable names without any stipulation of name properties such as first letter, number of syllables, origin, meaning, or access to name lists categorized by style or popularity. Referring to FIG. 4, an illustration of data objects for use in the exemplary embodiment is shown. The exemplary embodiment presents a set of name suggestions 402 (a "presentation set") that is retrieved from a database 404 by using a set of names selected by the user 406 (a "selection set"), according to preference, from a prior presentation set of names. The suggestions in the presentation set are derived from names selected or entered by the user (the selection set) based on feature information of the selected or entered names as may be included in the database. Names marked negatively or blocked by the user may be excluded from the suggestion set of names and from future presentation sets. The feature information may include, without limitation, popularity, origin, meaning, phonetics, syllabics, phonemics, style and alphabetic structure. These features may include various levels of refinement. For example, but without limitation, popularity may be clustered according to popularity trends for certain time periods, or according to popularity trends by state or other location or area, or according to a combination of location and time period. Some features may also be derived from past usage of the service by some or all users.

Figure 5A:
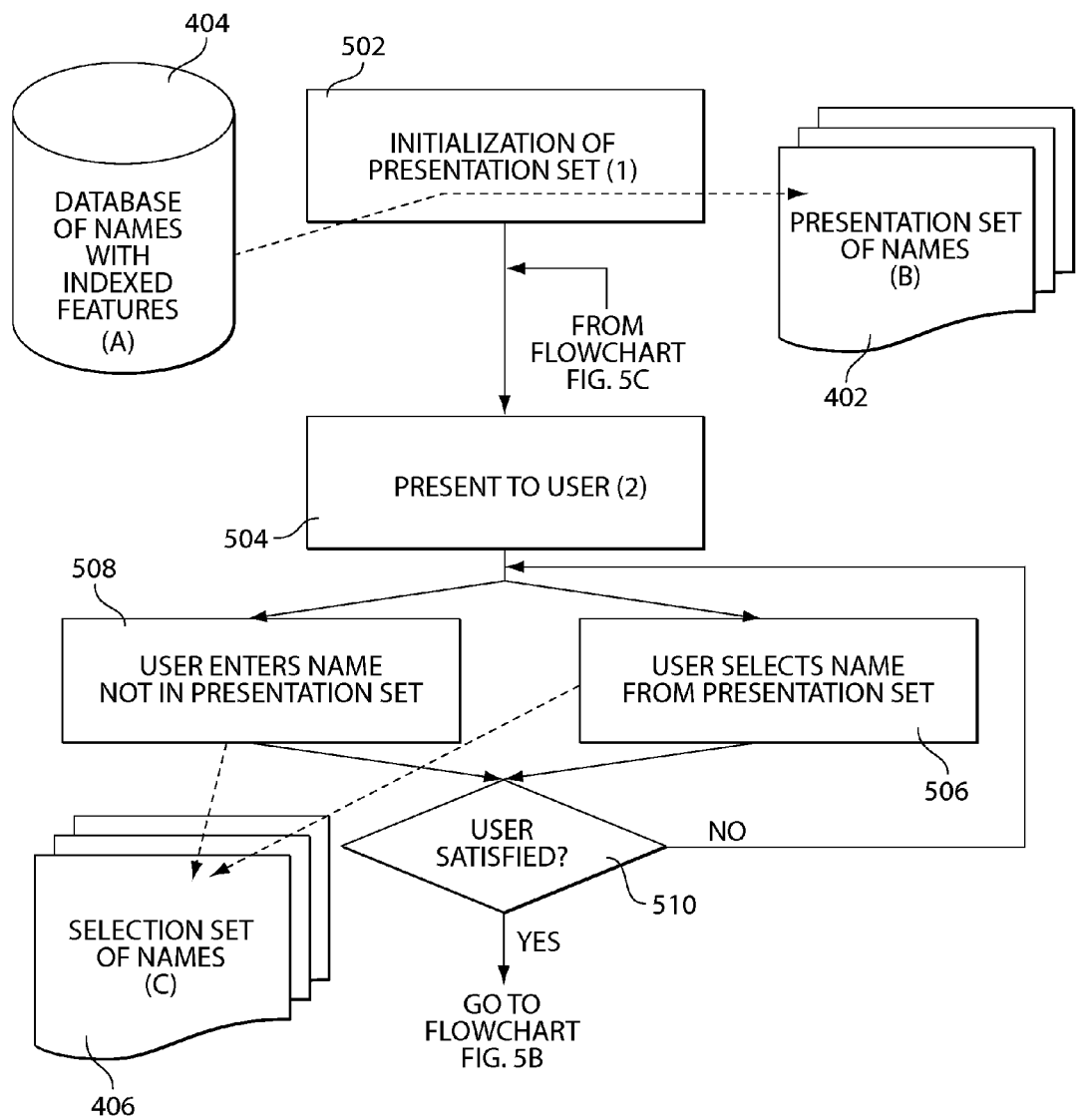
FIGS. 5a, 5b and 5c provide illustrations of a flowchart according to an embodiment of the present disclosure for interactive name searching.
Figure 5B:
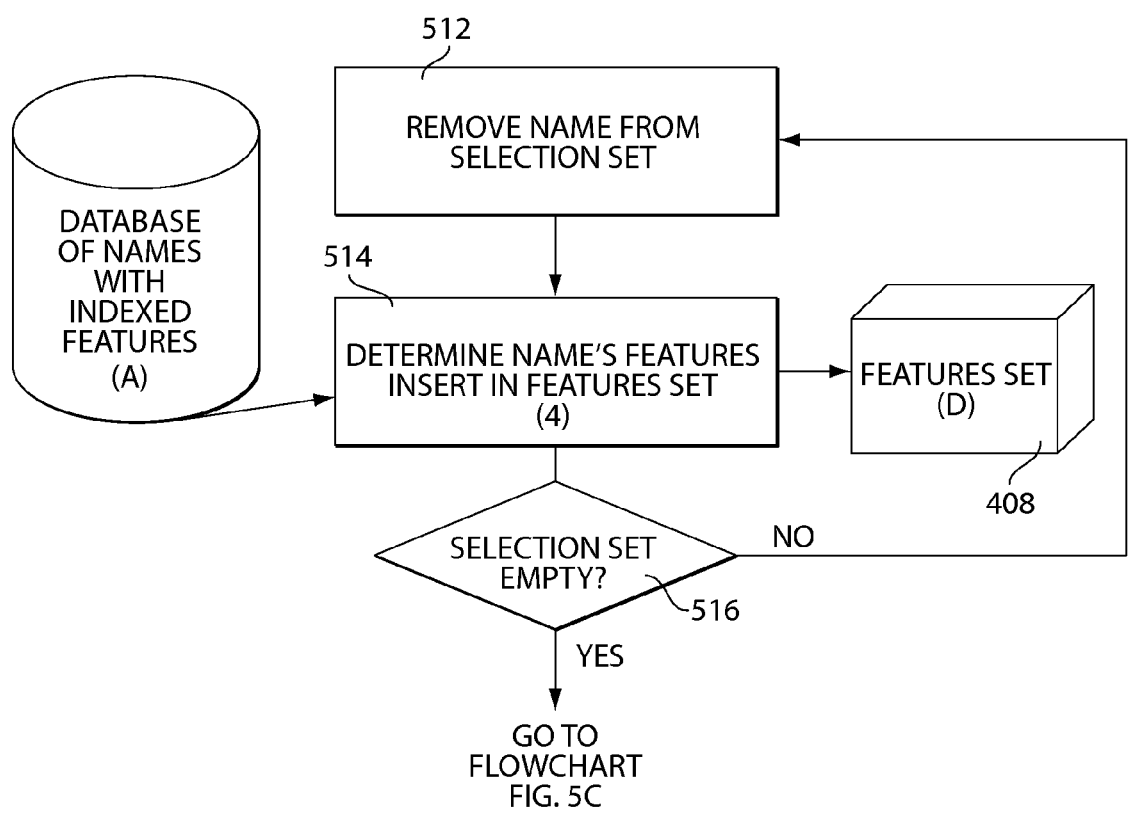
Figure 5C:
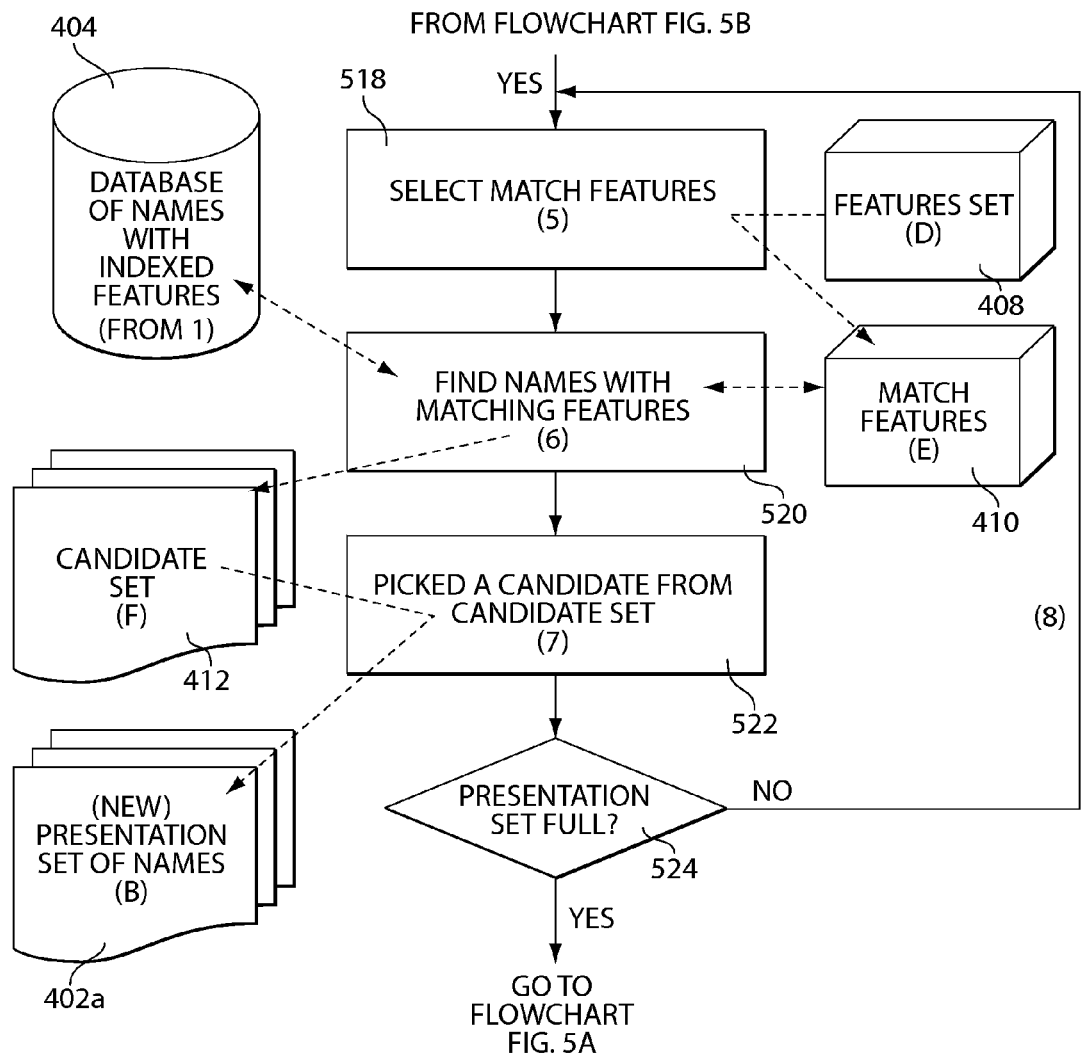

Referring also to FIGS. 5a-5c, an initial presentation set of names 402 is chosen from the database 404 at step 502. The initial presentation set may be chosen from among a set of names having a full complement of features. To begin, the initial presentation set is presented 504 to the user through a display or other output device. The user selects 506 names from the presentation set and/or provides 508 names that can be found in the database to form the selection set of names 406, and the said names are received through an input device. As shown in FIG. 5, the user may select any number of names until the user is satisfied with the number of choices 510, or a maximum number of choices may be imposed. For each name in the selection set, the name is removed 512 from the selection set, some or all of the features of the name are extracted 514 from the database of names and the some or all of the features are inserted 514 into a features set 408.

Once the selection set is empty 516 (that is, once features of the names in the selection set have been extracted and placed in the features set), Interactive Evolutionary Algorithm (IEA) forms 518 a set of match features 410. The match features may be chosen according to a priority function applied to the features set and/or weighting of the features of the features set. The priority function may include, without limitation, one or more genetic operators: a selection operator, a mutation operator, a recombination operator, a crossover operator, a directed operator, a constraint operator, or a preservation operator. The IEA may obtain a candidate set of names 412 in the database by finding names 520 where each name has features that match one or more of the match features. One or more names may be chosen 522 from the candidate set and added into a new presentation set of names 402a. The IEA may repeat the formation of the match features, candidate set, and selection of one or more names from the candidate set until the new presentation set is complete, as determined at 524. Names that were marked negatively or blocked by the user may be excluded from the presentation set. With each iteration, the priority function and/or weighting of the features may be varied so as to provide a new set of match features and a new candidate set. Once completed, the new presentation set may then be presented to the user 504 as per the initial presentation set and the sequence may repeat until the user is satisfied.

The apparatus for implementing the methods illustrated by the flowcharts of FIGS. 5a-5c may include software on computer-readable media and a computer interface. One exemplary interface is a web page. The software may display the presentation set in any number of ways, e.g. grid style or vertically, and may use icons to indicate functional processes of the technology as per the flow chart. The interface allows for interactive use, on the web, by users. Users select names from the presentation set and/or enter one or more names. The user may then repeat this selection from a new presentation set each time the algorithm examines their selection set and returns a new presentation set. The methods and apparatus may be particularly applicable for, though not limited to, expectant parents in search of baby names and/or businesses in search of new product or business names and/or people in search of pet names.

As described herein, the selection of match features may be based on a priority function applied to the features set and/or weighting of features in the features set. In order to obtain varying candidate sets for each iteration illustrated in FIG. 5c, the priority function and/or weighting may be varied. For example, popularity may be given the greatest weight in one iteration, while meaning may be given the greatest weight in another iteration. In a further example, a genetic operator may be applied to the previous set of match features to obtain a new set of match features. The varying of weights and/or the application of genetic operators may be randomized or may follow a predetermined sequence. Further, weighting may be affected by the user choosing to delete a name from a presentation set, indicating a strong dislike of the name. Weighting of the corresponding features may be reduced and/or the weights may include negative values. Weighting may also be modified according to past usage of the service by some or all users.

In addition, choosing from the candidate sets for inclusion in the new presentation set may depend on a predetermined set of rules, or one or more members of the candidate set may be chosen at random, or a combination of rules and random choices may be applied. As an exemplary, but not limiting, combination rule and random choice, the top best match and a random one of the candidate set may be chosen from each candidate set formed by the IEA.

As is known in the art, social community information, based on usage of the methods and apparatus described herein, may inform the features included in the database and/or the operation of the IEA. As an example, past usage of the interface may indicate that users who include the name "ALICE" in their selection sets also tended to include the name "EMILY". Accordingly, the database may include a link feature between the two names that the IEA may incorporate in the set of match features.

As used herein, a "user interface" is an interface between a human user and a computer that enables communication between the user and the computer. A user interface may include an auditory indicator such as a speaker, and/or a graphical user interface (GUI) including one or more displays. A user interface also may include one or more selection devices including a mouse, a keyboard, a keypad, a track ball, a microphone, a touch screen, a game controller (e.g., a joystick), etc., or any combinations thereof.

As used herein, an "application programming interface" or "API" is a set of one or more computer-readable instructions that provide access to one or more other sets of computer-readable instructions that define functions, so that such functions can be configured to be executed on a computer in conjunction with an application program, in some instances to communicate various data, parameters, and general information between two programs.

The various methods, acts thereof, and various embodiments and variations of these methods and acts, individually or in combination, may be defined by computer-readable signals tangibly embodied on one or more computer-readable media, for example, non-volatile recording media, integrated circuit memory elements, or a combination thereof. Such signals may define instructions, for example, as part of one or more programs, that, as a result of being executed by a computer, instruct the computer to perform one or more of the methods or acts described herein, and/or various embodiments, variations and combination thereof. Such instructions may be written in any of a plurality of programming languages or using any of a plurality of programming techniques.

For example, various methods according to the present disclosure may be programmed using an object-oriented programming language. Alternatively, functional, scripting, and/or logical programming languages may be used. Various aspects of the disclosure may be implemented in a non-programmed environment (e.g., documents created in HTML, XML or other format that, when viewed in a window of a browser program, render aspects of a graphical-user interface (GUI) or perform other functions). Various aspects of the disclosure may be implemented as programmed or non-programmed elements, or combinations thereof.

A given computer-readable medium may be transportable such that the instructions stored thereon can be loaded onto any computer system resource to implement various aspects of the present disclosure. In addition, it should be appreciated that the instructions stored on the computer-readable medium are not limited to instructions embodied as part of an application program running on a host computer. Rather, the instructions may be embodied as any type of computer code (e.g., software or microcode) that can be employed to program a processor to implement various aspects of the present disclosure.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A method of facilitating a user choosing a name, comprising:
   a) presenting to the user through an output device an initial presentation set of a plurality of names;
   b) receiving from the user through an input device a selection set of a user plurality of names, wherein the user has selected the said user plurality of names from one or more of the said initial presentation set and a database of names,
   c) extracting, from the said selection set of a user plurality of names, features to form a feature set;
   d) forming a set of matched features from the said feature set at least in part by use of one or more of weighting, prioritizing and operation of a genetic algorithm, and by using information about past usage of the method by some or all past users;
   e) searching for names in the said database of names based upon the said set of matched features;
   f) choosing based at least in part upon results of the said search for names a further presentation set of a further plurality of names;
   g) presenting to the user through the output device the said further presentation set of a further plurality of names; and
   h) when a further selection set of a further user plurality of names is received from the user through the input device, wherein the user has selected the said further user plurality of names from one or more of the said further presentation set and the said database of names, repeating steps c) through g).

2. The method of claim 1, wherein operation of the genetic algorithm includes one of more of: a mutation operator, a crossover operator, a substitution operator, a selection operator, a recombination operator, a preservation operator, and a constraint operator.

3. The method of claim 1, wherein features include one or more of: popularity, origin, meaning, phonetics, style and alphabetic structure.

4. The method of claim 3, wherein popularity may include one or more of popularity for a certain time period, popularity for a certain geographic region, or a combination thereof.

5. The method of claim 3, wherein the weighting is specified at least in part by the user.

6. The method of claim 1, further comprising forming the set of matched features at least in part by using information concerning at least one name that was marked negatively or blocked by the user.

7. The method of claim 1, further comprising excluding at least one name that was marked negatively or blocked by the user from the further presentation set.

8. A computer readable medium, containing instructions which, when executed in a computer system, cause the said computer system to perform a method of facilitating a user choosing a name, comprising:
   a) presenting to the user through an output device an initial presentation set of a plurality of names;
   b) receiving from the user through an input device a selection set of a user plurality of names, wherein the user has selected the said user plurality of names from one or more of the said initial presentation set and a database of names,
   c) extracting, from the said selection set of a user plurality of names, features to form a feature set;
   d) forming a set of matched features from the said feature set at least in part by use of one or more of weighting, prioritizing and operation of a genetic algorithm, and by using information about past usage of the method by some or all past users;
   e) searching for names in the said database of names based upon the said set of matched features;
   f) choosing based at least in part upon results of the said search for names a further presentation set of a further plurality of names;
   g) presenting to the user through the output device the said further presentation set of a further plurality of names; and
   h) when a further selection set of a further user plurality of names is received from the user through the input device, wherein the user has selected the said further user plurality of names from one or more of the said further presentation set and the said database of names, repeating steps c) through g).

9. The computer readable medium of claim 8, further containing instructions which, when executed in the said computer system, cause the said computer system to perform a method wherein operation of the genetic algorithm includes one of more of: a mutation operator, a crossover operator, a substitution operator, a selection operator, a recombination operator, a preservation operator, and a constraint operator.

10. The computer readable medium of claim 8, further containing instructions which, when executed in the said computer system, cause the said computer system to perform a method wherein features include one or more of: popularity, origin, meaning, phonetics, style and alphabetic structure.

11. The computer readable medium of claim 10, further containing instructions which, when executed in the said computer system, cause the said computer system to perform a method wherein popularity may include one or more of popularity for a certain time period, popularity for a certain geographic region, or a combination thereof.

12. The computer readable medium of claim 10, further containing instructions which, when executed in the said computer system, cause the said computer system to perform a method wherein the weighting is specified at least in part by the user.

13. The computer readable medium of claim 8, further containing instructions which, when executed in the said computer system, cause the said computer system to perform a method further comprising forming the set of matched features at least in part by using information concerning at least one name that was marked negatively or blocked by the user.

14. The computer readable medium of claim 8, further containing instructions which, when executed in the said computer system, cause the said computer system to perform a method further comprising excluding at least one name that was marked negatively or blocked by the user from the further presentation set.

* * * * *